(12) United States Patent  (10) Patent No.: US 9,387,899 B1
Mueller  (45) Date of Patent: Jul. 12, 2016

(54) ADJUSTABLE OPEN-AIR VEHICLE WINDSHIELD IMPLEMENT FOR FORCED AIR DISPLACEMENT

(71) Applicant: Allen B. Mueller, Rossville, TN (US)

(72) Inventor: Allen B. Mueller, Rossville, TN (US)

(*) Notice: Subject to any disclaimer, the term of this patent is extended or adjusted under 35 U.S.C. 154(b) by 0 days.

(21) Appl. No.: 14/445,069

(22) Filed: Jul. 29, 2014

(51) Int. Cl.
*B62J 17/00* (2006.01)
*B62J 17/04* (2006.01)

(52) U.S. Cl.
CPC ........................................ *B62J 17/04* (2013.01)

(58) Field of Classification Search
CPC .............................. B62J 17/04; B62D 35/007
USPC ............................................ 296/78.1, 180.1
See application file for complete search history.

(56) References Cited

U.S. PATENT DOCUMENTS

| | | |
|---|---|---|
| 2,381,633 A | 8/1945 | Young |
| 2,903,297 A | 9/1959 | Zbikowski |
| 3,406,995 A | 10/1968 | McCarthy |
| 4,082,345 A | 4/1978 | Willey |
| 4,226,463 A | 10/1980 | Gager, Jr. |
| 4,489,973 A | 12/1984 | Willey |
| 4,615,556 A | 10/1986 | Stahel |
| 5,060,992 A | 10/1991 | Anderson |
| 5,413,392 A | 5/1995 | Schlack et al. |
| 5,497,973 A | 3/1996 | Balzen et al. |
| 5,658,035 A | 8/1997 | Armstrong |
| 5,664,715 A | 9/1997 | Gogan et al. |
| 5,667,232 A | 9/1997 | Gogan et al. |
| 5,732,965 A | 3/1998 | Willey |
| 5,853,217 A | 12/1998 | Armstrong |
| 5,988,727 A | 11/1999 | Mueller |
| 6,443,344 B1 | 9/2002 | Nicosia et al. |
| 6,484,914 B1 | 11/2002 | Willey |
| 6,729,515 B2 | 5/2004 | Nicosia et al. |
| 6,974,175 B2 | 12/2005 | Willey |
| 7,150,382 B2 | 12/2006 | Zickefoose |
| 7,654,496 B2 | 2/2010 | Sharpe et al. |
| 7,946,632 B1 | 5/2011 | Mueller |
| 8,123,273 B2* | 2/2012 | Tsuda et al. ................. 296/78.1 |
| 2003/0227178 A1 | 12/2003 | Hofhauser |
| 2006/0232091 A1* | 10/2006 | Fox et al. ..................... 296/78.1 |
| 2007/0296237 A1* | 12/2007 | Anderson .................... 296/78.1 |

FOREIGN PATENT DOCUMENTS

| | | |
|---|---|---|
| EP | 0060807 A1 | 9/1982 |
| GB | 827330 | 2/1960 |

* cited by examiner

*Primary Examiner* — Glenn Dayoan
*Assistant Examiner* — Melissa A Black
(74) *Attorney, Agent, or Firm* — Wyatt, Tarrant & Combs, LLP; Stephen C. Hall

(57) ABSTRACT

An add-on implement for an open-air vehicle windshield to allow for suitable protection and viewing therethrough while simultaneously forcing blown air over the driver's/rider's/passenger's sight line is provided. Such a device includes a wing that produces a venturi effect when placed a specific range of distances from the windshield's outer surface and having a certain height range relative to the windshield. The venturi action sends air over the top of the windshield as much as four inches higher than a normal open-air vehicle windshield, thereby allowing the driver, etc., the ability to see well over the windshield without the problem of turbulent air in his or her face or on top of his or her head. The device is adjustable to permit the driver on-demand modification of wind displacement height. An open-air vehicle (again, such as a motorcycle) including such a device is also encompassed herein.

19 Claims, 3 Drawing Sheets

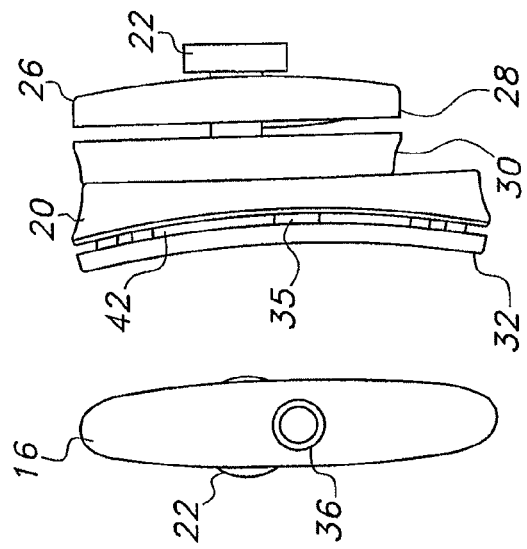
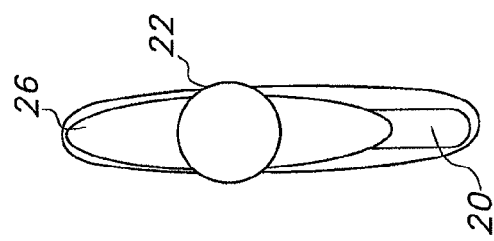
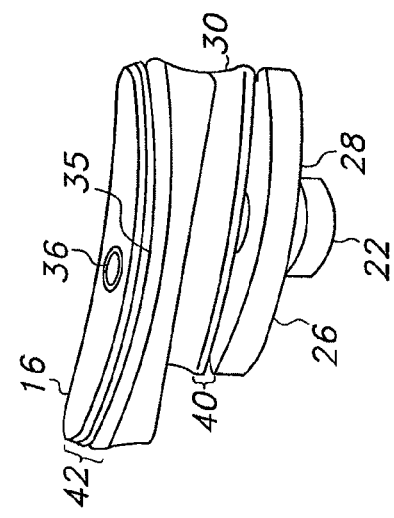

ADJUSTABLE OPEN-AIR VEHICLE WINDSHIELD IMPLEMENT FOR FORCED AIR DISPLACEMENT

FIELD OF THE INVENTION

The present invention relates to a device used in the construction of an open-air vehicle (e.g., motorcycle, as one example) windshield which allows for completely unobstructed viewing while simultaneously sending the airstream over the rider's/driver's/passenger's head. Such a device includes a wing that produces a venturi effect when placed a specific range of distances from the windshield's outer surface and having a certain height range relative to the windshield. The venturi action sends air over the top of the windshield as much as four inches higher than a normal open-air vehicle windshield, thereby allowing the driver, etc., the ability to see well over the windshield without the problem of turbulent air in his or her face or on top of his or her head. The device is adjustable as well to permit the driver the ability to modify the height of wind displacement on demand. An open-air vehicle (again, such as a motorcycle) including such a device is also encompassed within this invention.

BACKGROUND OF THE INVENTION

Open-air vehicles, such as, without limitation, motorcycles, have long been both a source of enormous enjoyment to many riders as well as a source of discomfort, particularly for such vehicle operators. The metaphorical freedom of "feeling the wind" in the midst of motorcycle riding is certainly a major draw for many aficionados. However, having to combat the force of the wind causes strain and fatigue which limits the overall level of experience and enjoyment and thus many operators use a windshield. Windshields protect operators from the wind, cold, weather and road debris so windshields are commonplace in association with motorcycle riding. Windshields provide external barriers to the operator's face, as well, albeit in a manner that requires the top edge of such an implement to be at a specific level for such a purpose. In either case, the rider must view the road through transparent shields that may be effective for protective purposes, certainly, but can still impede the overall capability of the rider to see. If road grime accumulations occur, further problems may ensue for the operator as this further impedes visibility. Likewise, such weather events may also cause a windshield to be covered with water (and/or ice and snow), causing significant problems for the user, as motorcycle windshields typically have no wipers. Thus, the common requirement for a transparent barrier of some type may severely limit the capabilities of the motorcycle rider to operate such a vehicle in different situations. Furthermore, even with a windshield in place that provides effective protections in this manner, it is common for such implements to contribute to wind turbulence (or buffeting) as the air and/or wind passes over the top windshield edge. In this manner, then, even though some protections are accorded the rider with a windshield in place, if the height is too low in relation to his or her line of sight, the resultant turbulent air may further complicate matters. As such, if the rider is inclined to look over his or her windshield during operation, the turbulent wind often creates buffeting on the rider's head making driving difficult and unenjoyable.

As such, the motorcycle industry (among other open-air vehicle industries, including speed boats, ATVs, ultra-light aircraft, bass boats, three-wheeled sports vehicles, such as the Can-Am Spyder, and any other vehicles where the operator's head is subject to air flow) has long sought the ability to provide riders the ability to view the road without the need for transparent shields of some type directly in the rider's line of sight. In other words, motorcycle riders desire some type of device or implement that allows for an unfettered view of the road ahead but still protects them from the wind. To date, there have been no effective means to provide such a potential improvement. The closest developments in this area have basically been windshields or windscreens that are adjustable up or down or at differing angles on demand, or attachments to windshields that adjust up or down or at different angles. These structures, however, are limited to devices that have single adjustment points or angle adjustment points. Although these types of add-on devices allow for different levels of protection to the driver during operation, in actuality, there is little additional air displacement capability beyond the turbulent buffeting results described above. Other devices simply have a windshield that allows for an extra screen to lower or raise within a housing; however, there is no channel opening made available that permits any type of air displacement other than the same buffeting results described above. In essence, the "extra" screen implements within the prior art are distinctly not provided for any purpose other than air direction and extra height protections for the user. Any air displacement accorded the operator with these structures does not, due to the open nature of the overall added devices, channel air to the degree necessary and desired within the industry (e.g., capturing and sending the air a certain height over the windshield while smoothing the flow, rather than contributing to turbulence once the air passes over the windshield's top edge). Thus, these prior art windshield add-on implements are generally associated with and limited to issues pertaining to the height of the driver alone, and still limit sight lines as the top edge of such adjustable implements are still necessarily within the rider's line of sight. Windshields have been made with center vents which serve to reduce turbulence and buffeting, but none serve to raise the air stream appreciably.

The industry has provided all manner of devices to shield the rider but there has been no effective device provided to the motorcycle industry that affords full freedom from wind and turbulence while remaining out of the rider's line of sight.

Advantages and Summary of the Invention

It is an advantage of the present invention to provide a suitable windshield device that has a top edge that adjusts to a level well below that of the user's line of sight and still effectively protects such a person's head from turbulent air during open-air vehicle (e.g., motorcycle, as one example) operation. Another advantage of this inventive device is the ability to manipulate oncoming air through a channel to a height that is significantly higher than the windshield's top edge (and well above the typical height of oncoming air passing over an open-air vehicle windshield), as well as above the user's head during operation. It is an additional advantage that the inventive adjustable windshield device (implement) is transparent in nature itself, thus allowing for views there through if such a need arises while riding. Yet another advantage of this invention is the ability to precisely adjust the height of the device on demand to correlate to the height of the operating rider.

Accordingly, the present invention encompasses a transparent windshield having an internal side, an external side, and a top edge, said windshield further including a separate transparent component exhibiting a concave shape and attached to the external side of said windshield; wherein said concave transparent component includes an internal side, an external side, a bottom edge and a top edge, wherein said bottom edge is configured with an arc disposed in the middle thereof of flat opposing ends; wherein said top edge is a full arc leading from one of said flat opposing ends of said bottom edge to the other flat opposing end of said bottom edge; wherein said separate transparent component is attached to said external side of said windshield through two opposing, parallel connectors that are solid in shape with a longer height than width such that said connectors have top ends, bottom ends, front sides, back sides, and right and left sides, wherein said connectors are disposed and centered on either side of said bottom edge arc of said separate transparent component such that said front sides thereof are attached to said separate transparent shield component with said bottom ends thereof present at points below that for the attachment of said top ends to said shield component, wherein the disposition of said connectors is substantially straight pointing upwards; wherein said back sides of said connectors are attached to said external side of said windshield in centered disposition thereof; wherein upon attachment of said connectors to both said windshield and said separate transparent shield component, the windshield and separate shield create a channel with the connectors (which, in operation at speeds exceeding 50 mph, channels air into the bottom thereof and out the top at a height well above the top edge of the windshield itself). More particularly, then, the concave nature of the separate shield component, coupled with the channeling capabilities of the solid connectors, allows for winds at speeds exceeding 65 mph to pass through such a channel (venturi) and exit at a disposition and at a speed that forces such air to rise to a height of at least 2 inches (as high as 3-4 inches) higher than without said transparent component, above the top edge of said windshield before being forced back in the direction of the operator. Additionally, then, an open-air vehicle, such as, again, as one example, a motorcycle, including such a venturi device with a windshield is also encompassed within this invention.

Such a windshield composite structure thus allows for air displacement through such a formed channel (again, based upon the separate shield component, the base windshield, and the two solid, parallel, connectors) at a velocity and in the direction to create the desired raised height effect sought after within the industry. Without intending to limit the invention to any specific scientific theory, it appears that such a venturi (channel) allows for the open-air vehicle (e.g., motorcycle, for example) to aerodynamically move smoothly without creating turbulent buffeting at and beyond the top edge of the windshield itself. Thus, the channel further appears to provide an aerodynamic result such that air is drawn through such a channel and forced upward at the necessary velocity, as mentioned above, as well as in the properly formed column, to exit such a structure with the proper trajectory to cause the column to continue upwards thereafter until at least 2 inches (as high as 3-4 inches depending on factors such as the motorcycle traveling speed) higher than without said transparent component, above the base windshield top edge. In this manner, the operator has a 2 or more inch windshield height reduction to adjust his or her sight line above the windshield top edge without turbulence or blown air impeding his or her view and comfort.

The channel (venturi) is, again, formed by the proper attachment of the separate transparent component shield to the base windshield, with the specific parallel connectors in place, as described above. The connectors must also exhibit a specific height from base windshield to separate shield implement in order to provide a uniform distance between the two surfaces for the proper channel configuration to be provided. As well, and again, as noted above, the connectors themselves must be solid in nature, with at least 3 inches thereof present as channel sides for the formed channel structure (in certain embodiments, the connectors may exhibit lower heights over the extent of their structures, thus creating limited areas that permit air to pass prior to entering the actual formed channel itself; however, the majority of the connector structures will create such channel sides, as noted above, for the 3-inch minimum length). In other words, the connectors not only hold the two windshield components together, but the solid natures thereof provide the necessary solid sides of the formed venturi; if the connectors had multiple staggered openings, or were at single, small, connection points, rather than providing attachments along the minimal length of each connector structure, then the necessary air displacement channel could not be formed. In comparison, prior art extended shield structures are limited to low profile points for minimal connections, as well as adjustable hinge devices that do not form an enclosed channel as is now required.

The connectors themselves are secured to the base windshield through the utilization of parallel vertical slots (with the windshield itself connected to the motorcycle). When placed within the slots, the connectors are configured to allow for operator access to an adjustment mechanism (such as a screw-type device, for instance) that is attached to a cap structure that is wider at its outer edge than compared with an internal base structure. This internal structure slides into the vertical slot of the base windshield and the wider outer edge prevents horizontal movement when in place. Multiple bolts (or screws, and the like) then allow for tightening of the cap structure in place within the slot. On the other side of the cap structure, then, is a shield implement cap structure that extends outwardly from the base windshield with a shield implement slot present therein in relation to the concave shape of the implement itself. The implement can thus be introduced within this slot structure and held opposite to the base windshield, and can readily be configured to allow a distance of 1.25-1.5 inches between the implement and windshield with spacing of 10-15 inches apart, through screws, bolts, and the like, or through friction due to the rigidity of the connector materials to retain such an implement during operation. As noted above, the operator has access to adjustment mechanisms for both connectors at the internal side of the base windshield when the shield implement is in place. Such a mechanism allows the operator to loosen the connection of the shield implement to permit vertical raising or lowering thereof to a height that accords maximum proficiency for air displacement while maintaining venturi operation throughout the range of raising and lowering. Basically, the exit height of the displaced air from the formed channel can be measured and adjusted to the proper level by the operator simply by adjusting the height of the shield implement. For a certain height range, such adjustments can be permitted in varying levels, although, for simplicity sake, it is potentially preferred that three different height levels be provided, in addition to a smaller infinite adjustment range within a given height level, in order to facilitate operations thereof. If such adjustments were available along an infinite line, for instance, it would be difficult for the operator to determine the exact uniform level for both connectors to align properly; misalignment would deleteriously affect the overall performance of the channel device and defeat the overall purpose thereof. Thus, with a limited number of easily determined height levels available, along with a smaller infinite adjustment range between those levels, the operator can adjust the shield implement reliably and securely for optimal effect.

The shield implement itself may be constructed of any acceptable type of transparent material that is sufficiently strong to permit the rigors of air channeling in this fashion. Certainly, the same materials as used within the base windshield may be utilized for this purpose, if only to align the refractive index of both structures for the benefit of the operator. Thus, materials such as cast or extruded acrylic (polymethyl methacrylate, for instance), polycarbonate, and the like, may be utilized as the shield implement material. The connectors are preferably of a certain rigidity and strength to accord the necessary capability of retaining the shield implement and attaching, as well, to the base windshield simultaneously. Minimal flexibility may be permitted, however, to compensate for jarring road effects on occasion. The connector materials are thus preferably nylon or similar material.

The curvature of the concave shape of the shield implement may be of any suitable arc measurement to allow for greater amounts of air to exit the formed channel than at the entry point. The venturi result thus creates a Bernoulli-type effect, to a certain degree, with a column of air drawn outwardly from the top of the channel that is of greater speed than that of the air entering the channel. The overall concavity may actually be (and preferably is, in some embodiments) very slight, rather than highly pronounced, in order to best promote the displaced air column speed, to avoid restricting the flow and to prevent turbulence at the base windshield top edge. As such, such concavity may be a depth of only 8-10 percent of the height of the implement at the center. The shield implement may also be of any length to extend beyond the attachment points of the connectors (and in such a fashion as to provide the necessary base retention capacity at such points; if the connectors were attached at the outer edges of the sides of the shield implement, the overall strength of the device itself may be compromised as the weaker attachment at such edges could lead to failure upon operation at high speeds, and thus consequently high air pressures). The connectors should be spaced apart measured from their inside edge lines 10-15 inches, depending upon the size of the base windshield.

Additionally, the shield implement bottom edge is preferably not a straight line, but of a configuration that has two opposing side edges that are disposed below the actual edge of an arced middle section thereof. It has been determined, without any intention of limiting such a conclusion to any single scientific theory, that the arced (and raised) middle section of the bottom edge of the shield implement contributes to the ability to control the overall displaced air velocity by providing a limited air intake capacity. Combined with the concave nature of the shield implement, as well, not only does this overall structure allow for the formation of the necessary venturi at the external side of the base windshield, but this structure also allows for deflection of air upward and away from the base windshield top edge to reduce, again, as discussed above, the propensity for buffeting to occur to the detriment of the motorcycle operator.

In this manner, then, upon connection to the base windshield, the formed channel accords the operator the ability to view over the windshield itself without turbulence to impede such a view. Thus, the ability to ride a motorcycle while enjoying the benefits of a windshield without the need to look through a windshield or endure turbulence and buffeting has been provided.

BRIEF DESCRIPTION OF THE DRAWINGS

FIG. 4 shows a side-view of one potential embodiment of a connector of the inventive windshield composite.

FIG. 5 shows a bottom view of the connector of FIG. 4.

FIG. 6 provides a top view of the connector of FIG. 4.

FIG. 7 provides a side perspective view of the connector of FIG. 4.

DETAILED DESCRIPTION OF THE DRAWINGS AND PREFERRED EMBODIMENTS OF THE INVENTION

Hereinafter, preferred embodiments of the present invention will now be described with reference to the accompanying drawing. Such descriptions are not intended to limit the scope of the overall invention but only to provide one potential embodiment thereof. Furthermore, although a motorcycle is presented herein as a representative open-air vehicle, it should be evident to the ordinarily skilled artisan that any type of vehicle that attains high speeds (e.g., in excess of 50 mph) and includes a transparent windshield and no roof component attached thereto (thus defined herein as "open-air"), may include such an inventive venturi component for the same purposes as described herein for the benefit of such a motorcycle example.

Figure 1:
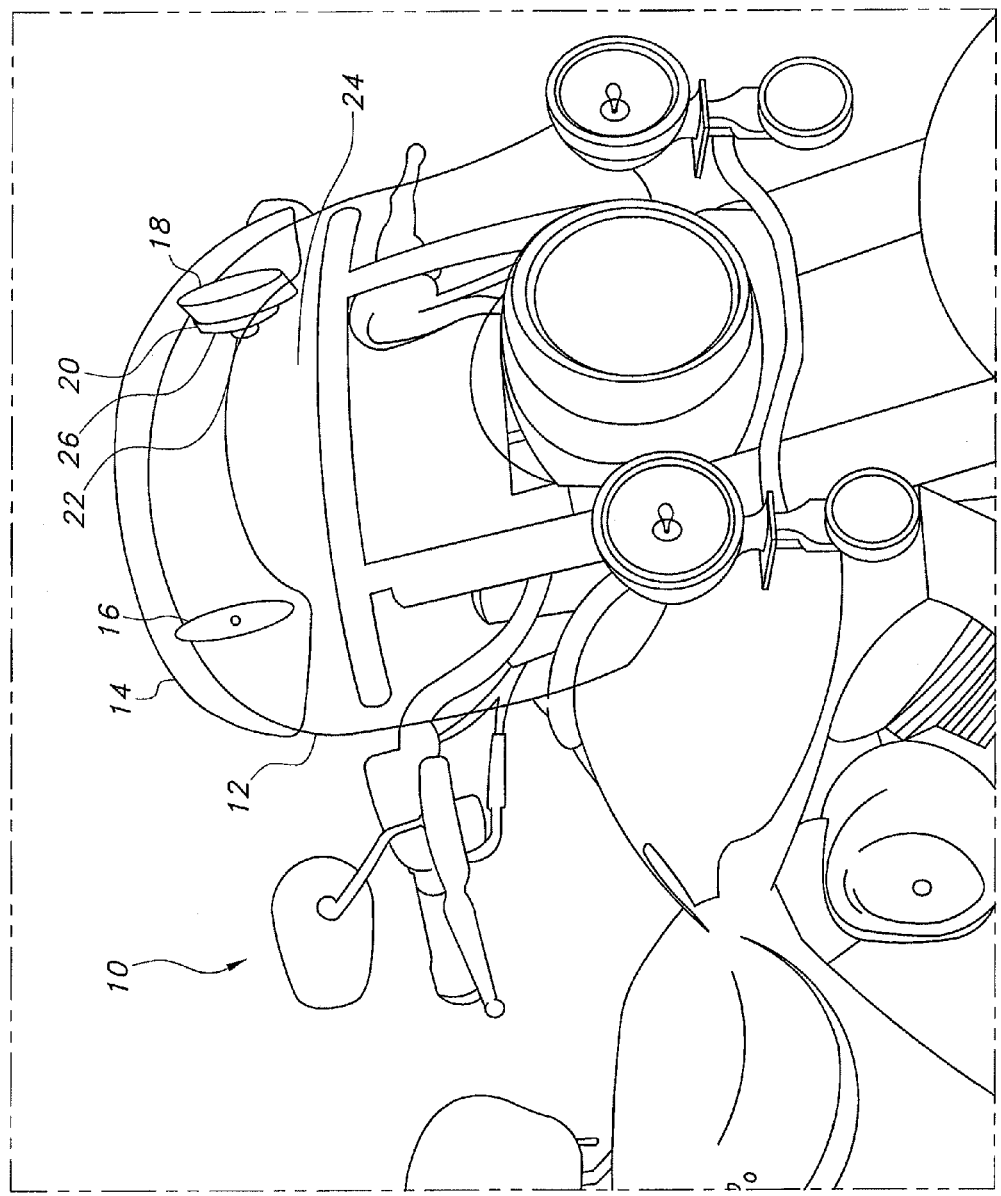
FIG. 1 depicts a front view of a motorcycle with the windshield composite structure forming the inventive air displacement channel.
Figure 2:
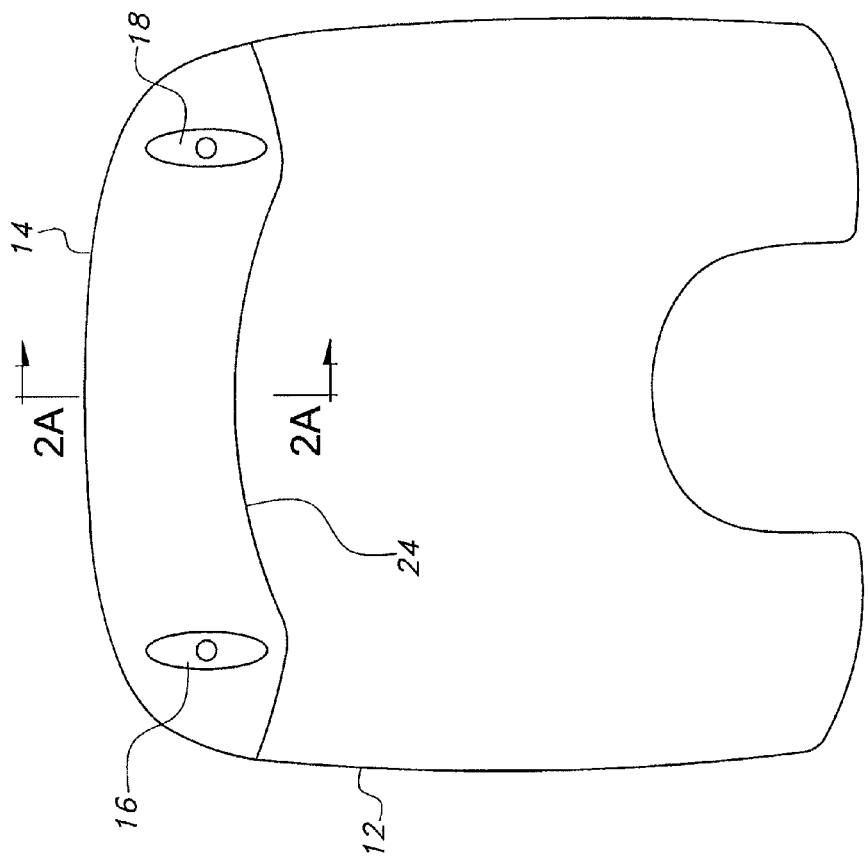
FIG. 2 depicts a front view of another embodiment of the inventive windshield composite.
Figure 3:
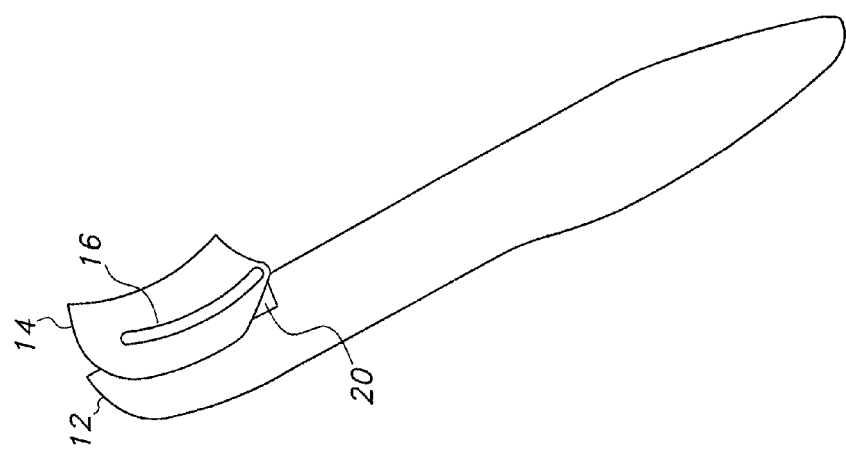
FIG. 3 shows a cross-sectional view of the composite of FIG. 2.

As shown in FIG. 1, a motorcycle 10 including a solid base windshield 12 has attached thereto a concave-shaped solid transparent shield implement 14. Such attachment is accomplished by the use of two parallel connectors 16, 18 providing separation between the shield implement 14 and base windshield 12, as well internal side walls to provide a channel 24 for air to transport through during operation of the motorcycle 10. This channel 24 permits, through the presence of the solid connectors 16, 18 to create such internal side walls thereof, as well as the base windshield 12 and shield implement 14, the ability to displace forced air above the top edge of the base windshield 12 (as described in greater detail, above). The connectors 16, 18 each include an adjustment knob 22 directed from the internal side of the base windshield 12, thus allowing access for the operator to make height adjustments of the shield implement 14 as needed to optimize air displacement results. This adjustment knob 22 is situated on an internal base windshield cap 26 that allows for attachment to the base windshield 12 (such as through a properly situated and aligned vertical slot, for example, not illustrated). On the other side of the base windshield 12 is shield saddle component 20 that contacts a shield cap 18. The shield cap 18 includes a curved retention slot (42 of FIG. 4) that is aligned with the curvature of the shield implement 14 to hold it in place when attached to the base windshield 12 through the connectors 16, 18. FIGS. 2 and 3 show a more distinct view of the base windshield/shield implement composite 100. FIG. 2 shows a shield implement 14 again attached to a base windshield 12 through juxtaposed vertical connectors 16, 18. FIG. 3 shows the same composite 100 but in cross-section (through A-A of FIG. 2). The shield implement 14 exhibit's a concave shape with the connector 16 aligned in shape at the shield surface to complement the curvature thereof for, as noted above, proper retention purposes. A shield implement saddle 20 is present to space the shield implement 14 from the base windshield 12 as well as provide channel side walls (as described above) for the formation, with the base windshield 12 and shield implement 14, of the necessary air displacement channel 24. The shield implement 14 in this potentially preferred embodiment is thus concave at its top external surface, with its top edge in an arc shape (to closely match, if not be identical to, the edge dimensions of the base windshield 12 for substantially uniform alignment therewith; in this manner the potential for turbulence is drastically reduced, if not eliminated, at the base windshield top edge during motorcycle operation). The bottom edge of the shield implement 14 provides left and right symmetrically shaped portions with an arced middle portion. This configuration is one potentially preferred design for the shield implement 14 that accords the desired air displacement effects noted herein (i.e., a column of air exiting the top of the formed channel 24 that does not stream backward past the base windshield top edge below a height of about 2, preferably at least 3, inches over said base windshield top edge during motorcycle operation at 55 mph).

As further described above, the height of the shield implement 14 may be adjusted to at least 3 different levels (preferably, such adjustments are limited to 3 levels, although, if desired, more levels may be possibly incorporated) to allow for optimization of the air displacement characteristics in relation to the disposed height of the shield implement 14 in relation to the base windshield 12. FIGS. 4-7 provide different views of the connectors that serve this three-fold purpose of retaining both the base windshield and shield implement, allowing for adjustment of shield implement height, and providing side wall structures to the resultant air displacement channel formed by the windshield composite described herein.

In FIG. 4, the adjustment knob 22 extends from a windshield cap 26 that, combined with a windshield base retention component 30 provides a slot for introduction of the base windshield at specific locations thereon. A socket 28 is disposed within the slot to permit tightening, etc., of the adjustment knob to allow for proper adjustments to be made through activation of the knob 22 by an operator stationed behind the base windshield itself. The windshield base retention component 30 is contacted with and attached to a shield implement saddle component 20 with the length of retention component 30 shorter than that exhibited by the shield saddle component 20. This difference is length actually provides the base length available an operator to adjustment the height of the shield implement on demand. The adjustment is permitted up and down the shield saddle component 20 length in three different stations (again, preferably; more stations may be provided for adjustment with the knob 22). The shield saddle component 20 thus has a top edge attached (releasably) to the base windshield retention component 30, as well as a bottom edge that is curved to the same shape as the curve of the shield implement (e.g., concave in shape) in order to provide complementary structures for such shield implement retention purposes. The shield saddle component 20 thus forms a curved slot 42 in combination with a shield implement cap 32 to hold the shield implement itself. The adjustment knob 22 can thus loosen the overall attachments to permit raising and lowering the shield implement height on demand; as well, once the optimum height is determined, the adjustment knob 22 can properly tighten the overall composite at such a determined height. Importantly, as well, is the solid nature of the shield saddle component 20 to provide, as described in detail below, the side walls to the formed channel. FIG. 5 shows an elevated shield implement outward direction view of one potentially preferred connector 16. On the opposite side can be seen the adjustment knob 20, with a socket component 36 on the outward (here, top) edge that is tightened and loosened by the operator through the adjustment knob 22. FIG. 6 shows the same embodiment of the FIG. 5 device with the provided view the exact opposite thereof (FIG. 5 shows the bottom perspective and FIG. 6 the top perspective). The adjustment knob 22 is attached to the base windshield cap 26, with the shield implement saddle component 20 present and extending a length greater than that for the base windshield cap 26. Again, the shield implement saddle component 20 allows for the formation of channel walls during actual utilization. FIG. 7 is thus a perspective side view of the embodiment of FIG. 4. The adjustment knob 22 is spaced properly to attach (in releasable fashion) to the base windshield cap 26, with the resultant slot between the base windshield cap 26 and the windshield retention component 30 properly disposed to connect with the base windshield (12 of FIG. 1) through, as examples, cut-out slots aligned with the slot shape and configuration. The windshield retention component 30 and shield implement saddle component 20 are, again, attached in releasable fashion to allow for the loosening of such a connection through the activation of the adjustment knob 22 by the operator. This allows raising or lowering of the shield implement along both of these components 20, 30 on demand (at one of three levels; again, more adjustment levels may be available, if desired). Thus, the shield saddle component 20 combines, again, with a shield implement cap pad 16 to provide a curved slot 42 for introduction of the concave-shaped shield implement (14 of FIG. 1) at two opposing locations symmetrically disposed on either side of the center of the base windshield (12 of FIG. 1). The connectors (16, 18 of FIG. 1) is spaced apart at least 20 inches, and possibly up to about 30 inches, if desired, with the shield implement (14 of FIG. 1) secured within the curved slots 42 of the connectors between, again, the shield implement cap pad 16 and the shield implement saddle component 20. Upon tightening or loosening of the adjustment knob 22 by the operator, a properly situated socket 35 with an outwardly disposed nut 36 allows for the movement along the windshield base component 26 without interfering with the channel side wall structures accorded by the shield implement saddle component(s) 20.

Ultimately, then, the described windshield/shield implement composite structure provides the formation of a properly configured venturi (channel) to displace onrushing air to a height at least 2 inches higher than a windshield that does not include such an implement. The operator thus enjoys the protection of the windshield itself, but also now has the ability to actually situate him- or her-self to a sight line above the base windshield top edge without interference from such onrushing air hitting the windshield composite structure during operation. The elevated wind displacement capability of this novel device thus provides a significant and unexpectedly effective and beneficial result to the motorcycle industry, particularly with the ability to adjust the shield implement height for maximum effect.

The preceding examples are set forth to illustrate the principles of the invention, and specific embodiments of operation of the invention. The examples are not intended to limit the scope of the method. Additional embodiments and advantages within the scope of the claimed invention will be apparent to one of ordinary skill in the art.

What I claim is:

1. A transparent windshield composite structure for an open-air vehicle, comprising: a base windshield including an internal side, an external side, a bottom edge and a top edge; a separate transparent shield implement including an internal side, an external side, a bottom edge and a top edge; and a plurality of connectors for attaching said base windshield to said shield implement; wherein said separate transparent shield implement exhibits a concave shape directed externally from said base windshield, and wherein said windshield composite structure forms a channel through which air is forced during operation of the open-air vehicle on which said structure is present.

2. The windshield composite structure of claim 1 wherein said separate transparent shield implement component is attached to said external side of said base windshield through two opposing, parallel connectors, wherein said connectors are solid in shape with a longer height than width such that said connectors have top ends, bottom ends, front sides, back sides, and right and left sides, wherein said connectors are symmetrically disposed on either side of said bottom edge of said separate transparent component such that said front sides thereof are attached to said separate transparent shield component with said bottom ends thereof present at points below that for the attachment of said top ends to said shield component, wherein the disposition of said connectors is substantially straight pointing upwards; and wherein said back sides of said connectors are attached to said external side of said base windshield in symmetrical disposition thereof.

3. The windshield composite structure of claim 1 wherein said bottom edge of said shield implement is configured with an arc disposed in the middle thereof of flat opposing ends; and wherein said top edge is a full arc leading from one of said flat opposing ends of said bottom edge to the other flat opposing end of said bottom edge.

4. The windshield composite structure of claim 1 wherein said formed channel therein allows for the generation of winds at speeds exceeding 65 mph during open-air vehicle operation to pass through said channel automatically at a speed that forces such air to rise to a height of at least 2 inches higher than that exhibited by a windshield without said implement present before being forced back in the direction of the driver operator.

5. The windshield composite structure of claim 2 wherein said formed channel therein allows for the generation of winds at speeds exceeding 65 mph during open-air vehicle operation to pass through said channel automatically at a speed that forces such air to rise to a height of at least 2 inches higher than that exhibited by a windshield without said implement present before being forced back in the direction of the driver operator.

6. The windshield composite structure of claim 3 wherein said formed channel therein allows for the generation of winds at speeds exceeding 65 mph during open-air vehicle operation to pass through said channel automatically at a speed that forces such air to rise to a height of at least 2 inches higher than that exhibited by a windshield without said implement present before being forced back in the direction of the driver operator.

7. The windshield composite of claim 1 wherein said connectors allow for adjustment of the height of said separate shield implement on the external side of said windshield.

8. The windshield composite of claim 2 wherein said connectors allow for adjustment of the height of said separate shield implement on the external side of said windshield.

9. An open-air vehicle including the windshield composite of claim 1.

10. An open-air vehicle including the windshield composite of claim 2.

11. An open-air vehicle including the windshield composite of claim 3.

12. An open-air vehicle including the windshield composite of claim 4.

13. An open-air vehicle including the windshield composite of claim 7.

14. An open-air vehicle including the windshield composite of claim 8.

15. The open-air vehicle of claim 9, wherein said vehicle is a motorcycle.

16. A method of displacing forced air over an open-air vehicle driver during operation thereof, said method including the steps of: providing the windshield composite of claim 1; incorporating said composite within said open-air vehicle; and operating said open-air vehicle at a speed of at least 55 miles per hour; wherein, upon operation thereof, the air forced through and displaced by said channel formed by said windshield, said separate shield implement, and said solid parallel connectors of said windshield composite exits said channel at a point at least 2 inches higher than that exhibited by a windshield without said implement present before being forced back in the direction of the driver operator.

17. The method of claim 16 wherein said open-air vehicle is a motorcycle.

18. The windshield composite of claim 1, wherein the shield implement and base windshield are spaced at a distance of about 1.25-1.5 inches apart.

19. An apparatus for use with an open-air vehicle having a base windshield,
   comprising: a transparent shield implement configured for attachment to the base windshield, wherein said shield implement exhibits a concave shape and is configured for removable attachment with connectors to an external side of said base windshield such that the concave disposition of said implement is directed away from said base windshield, and wherein said shield implement includes a bottom edge configured with an arc disposed in the middle thereof of flat opposing ends; and said shield implement further includes a top edge which is a full arc leading from one of said flat opposing ends of said bottom edge to the other flat opposing end of said bottom edge.

* * * * *